US010733675B2

(12) United States Patent
Mittal et al.

(10) Patent No.: US 10,733,675 B2
(45) Date of Patent: Aug. 4, 2020

(54) ACCURACY AND SPEED OF AUTOMATICALLY PROCESSING RECORDS IN AN AUTOMATED ENVIRONMENT

(71) Applicant: WOLTERS KLUWER ELM SOLUTIONS, INC., Houston, TX (US)

(72) Inventors: Abhishek Mittal, Clark, NJ (US); Anand K. Ramteke, Edison, NJ (US); Sandeep Sacheti, Edison, NJ (US); Jeetu Gupta, New York, NY (US); Florence Merceron, New York, NY (US); Sharon Horozaniecki, Minneapolis, MN (US)

(73) Assignee: WOLTERS KLUWER ELM SOLUTIONS, INC., Houston, TX (US)

( * ) Notice: Subject to any disclaimer, the term of this patent is extended or adjusted under 35 U.S.C. 154(b) by 270 days.

(21) Appl. No.: 15/808,663

(22) Filed: Nov. 9, 2017

(65) Prior Publication Data
US 2019/0139147 A1    May 9, 2019

(51) Int. Cl.
G06Q 20/00        (2012.01)
G06Q 40/00        (2012.01)
G06N 20/00        (2019.01)

(52) U.S. Cl.
CPC ............. *G06Q 40/12* (2013.12); *G06N 20/00* (2019.01)

(58) Field of Classification Search
None
See application file for complete search history.

(56) References Cited

U.S. PATENT DOCUMENTS

| 9,454,733 | B1 * | 9/2016 | Purpura | ................. | G06N 20/00 |
| 9,785,983 | B2 * | 10/2017 | Zhao | .................... | G06Q 30/04 |
| 2010/0191634 | A1 * | 7/2010 | Macy | ................. | G06Q 30/0202 705/35 |
| 2017/0293951 | A1 * | 10/2017 | Nolan | .................... | G06N 5/025 |

OTHER PUBLICATIONS

Mills, Artificial Intelligence in Law: The State of Play 2016, Thomson Reuters Legal Executive Institute, 6 pp. (2016).
Williams-Alvarez, IBM Says New Watson Tool Could Dramatically Reduce Outside Counsel Spend, Corporate Counsel (May 16, 2017).

* cited by examiner

*Primary Examiner* — Allen C Chein
*Assistant Examiner* — Denisse Y Ortiz Roman
(74) *Attorney, Agent, or Firm* — Marshall, Gerstein & Borun LLP

(57) ABSTRACT

A description of a machine learning (ML) model is received, with the ML model including multiple features such as an unlikely combination feature, which corresponds to a first attribute to be located in an invoice and a second attribute to be located the invoice concurrently with the first attribute. Training data is received, including (i) invoice data with multiple invoices, each including the first attribute and the second attribute, and respective values of the first attribute and the second attribute, and (ii) validity data including indications of which of the invoices are valid and which of the invoices are invalid. The ML model is trained using the training data using the ML model. The training includes applying the values of the attributes to the unlikely combination feature. The ML model is applied to an invoice to be validated to determine a probability that the invoice is invalid.

20 Claims, 6 Drawing Sheets

ACCURACY AND SPEED OF AUTOMATICALLY PROCESSING RECORDS IN AN AUTOMATED ENVIRONMENT

FIELD OF THE DISCLOSURE

The following disclosure generally relates to systems and methods that use artificial intelligence techniques to process text-based data records susceptible to analytics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Most early approaches to automated text processing were based on pattern recognition, morphological decomposition, syntactic analysis, and rule-based processing. For example, a rule for analyzing text could have the general "if . . . then . . . else" structure. However, these approaches to processing text in general are limited and computationally inefficient.

Today, artificial intelligence (AI) systems widely utilize machine-learning (ML) models to analyze large sets of data, including text-based data. An ML model in general relies on a corpus of prior knowledge to predict future outcomes. For example, an ML model can be trained with data tuples listing the height, weight, and age of a professional basketball player, along with the number of points he or she scores per season. The height, weight, and age in this example can correspond to features, and the number of points can correspond to a label. Once trained, the ML model can predict how many points a basketball player of a certain height, weight, and age will score per season. The efficiency and accuracy of predictions an ML model yields to a large extent depends on how well the model is trained, what features the model is configured to recognize, and how the model is otherwise parameterized. In the example above, the data tuples can include additional features such as the month in which the basketball player was born, but this feature will likely increase the complexity of the model without improving the predictions. A less efficient model, even when capable of yielding generally accurate predictions, can require more computing power, more memory, and more time to execute.

One of the areas in which ML models potentially could be used is processing of invoices, which generally tend to be structured and worded in a recognizable manner, especially when these invoices pertain to the same industry. However, the large number of random variables, or "dimensions," that may be expected in an invoice (even when the industry is known) makes automatic processing of these invoices technically difficult. Other difficulties include differences in the way similar activities are described or coded, complex relationships between dimensions that cannot be easily expressed in terms of rules, deviations from common practices and formal guidelines, etc. Meanwhile, an inefficient ML model can require excessive processing power, memory, and time, as discussed above.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A system of this disclosure implements artificial intelligence (AI) techniques to automatically processes invoice data to detect various irregularities and determine probabilities of adjustments. The system in some implementations uses natural language processing (NLP) techniques to extract structured information from unstructured narratives and generate multi-class classification of tasks and individuals involves in executing the tasks, for example, as well as to generate scores indicative of proximity of units of text, model topics as hidden variables, etc. Further, the system in some implementations develops and operates a machine learning (ML) model, with features designed to improve the accuracy and speed at which a system generates predictions using the ML model. The system trains the ML model to reject non-compliant submissions using a corpus of invoices. In operation, the system uses the ML model to determine the probability that a certain line item in an invoice will require an adjustment. The system then can receive feedback data that indicates how accurately the predictions of the ML agreed with human operator input (e.g., input from a legal billing expert) and automatically recalibrate the ML model using the feedback data. In addition to assessing the probability of necessary adjustments, the ML model when used with legal invoices, for example, can identify non-billable items, instances where the biller's role is outside the norm, mismatches between rates and activities, instances where a task lacked prior approval, top violators within an organization, etc. Still further, the system in some implementations operates on a corpus of documents related to a certain entity (e.g., a certain service provider) and applies genetic algorithms (modeled after the mechanics of natural selection and genetics) to generate, or predict, features. In other words, the system dynamically adapts the model for the formal requirements and informal patterns associated with a corpus of invoices.

One example embodiment of these techniques is a computer-implemented method for automatically identifying potentially invalid invoices. The method can be executed by one or more processors and includes receiving a description of a machine learning (ML) model comprising multiple features including an unlikely combination feature, where the unlikely combination feature corresponds to a first attribute to be located in an invoice and a second attribute to be located the invoice concurrently with the first attribute. The method further includes receiving training data comprising (i) invoice data including multiple invoices, each including the first attribute and the second attribute, and respective values of the first attribute and the second attribute, and (ii) validity data including indications of which of the invoices are valid and which of the invoices are invalid; training the ML model using the training data, in accordance with the definition of the ML model, including applying the values of the first attribute and the second attribute to the unlikely combination feature; receiving an invoice to be validated; applying the ML model to the received invoice to determine a probability that the invoice is invalid; and providing an indication of the determined probability to a user via a user interface.

Another example embodiment of these techniques is a computing system including one or more processors and a non-transitory computer-readable medium. Instructions stored on the computer-readable medium, when executed on the one more processors, cause the system to execute the method outlined above.

In various implementations, the method described above also includes one or more of the following acts or steps. The first attribute is a task for which one or more billing entries were generated, and the second attribute is a role of a person who performed the task according to the one or more billing entries. The first attribute is a task for which one or more billing entries were generated, and the second attribute is a matter in connection with which the task was performed. The first attribute is a billable rate at which a task was performed, and the second attribute is units of time at which the billable rate was applied. The method includes providing a user interface via which an operator selects, from among the plurality of attribute, the first attribute and the second attribute, to be associated with the unlikely combination feature.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

Figure 1:
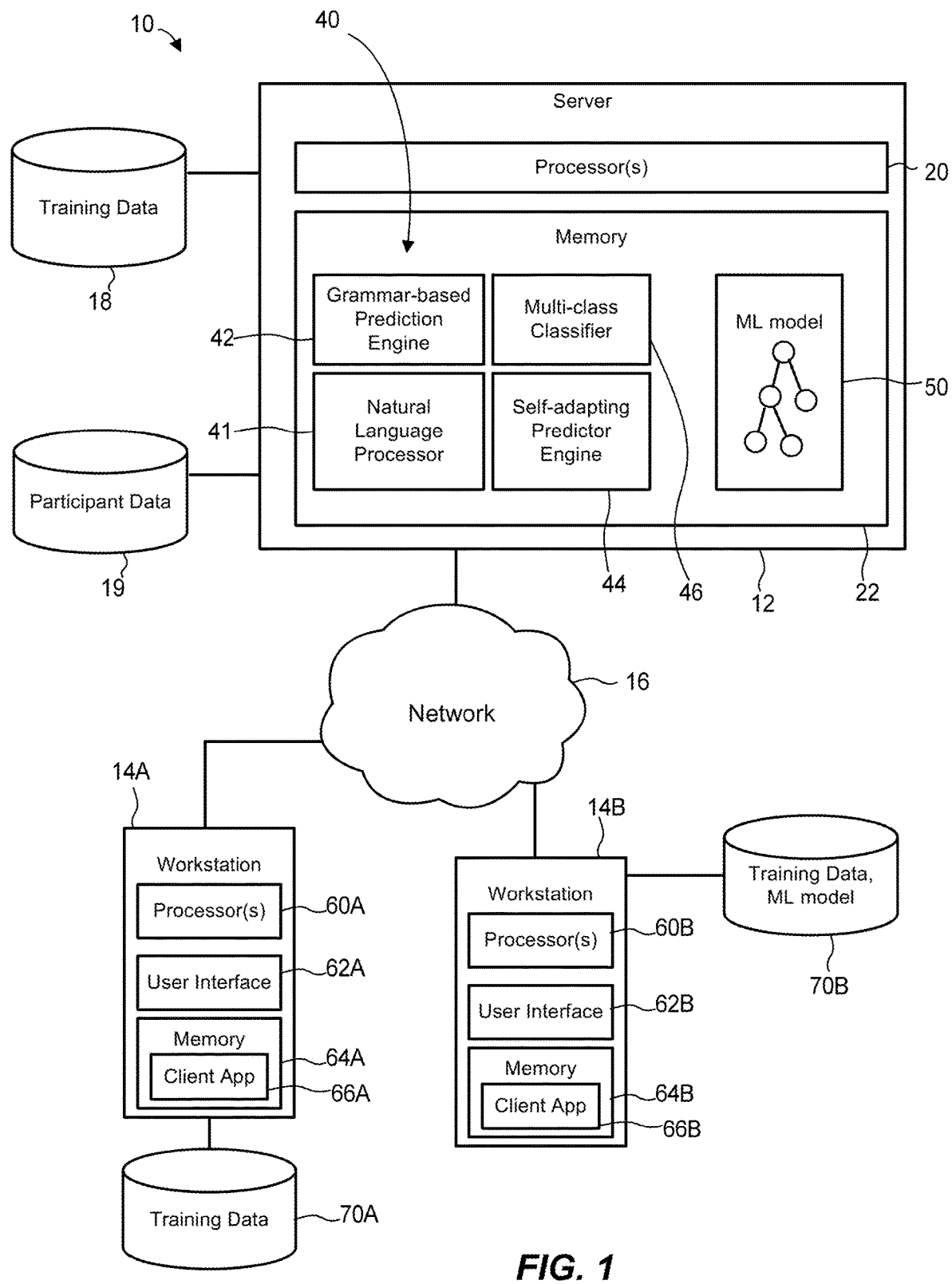
FIG. 1 is a block diagram of a system in which techniques for processing records can be implemented.

FIG. 1 illustrates an example computing environment 10 in which the data processing techniques of this disclosure can be implemented. The computing environment 10 can include a server system 12 which various computing devices, such as workstations 14A and 14B, can access via a communication network 16 (e.g., the Internet). The server 12 can be communicatively coupled to a database 18 storing training data, which can include invoices along with data indicating reasons for rejections, and a database 19 storing information regarding various entities using the data processing service. Each of the databases 18 and 19 can be implemented as a separate database or as part of a single database operating on one or multiple devices, using any suitable techniques (e.g., using a set of tables interconnected by indices to define a relational database).

The server system 12 includes one or more processors 20, which can include CPUs, GPUs, etc., and a non-transitory memory 22 readable by the one or more processors 20. The memory 22 can store instructions that implement an artificial intelligence (AI) system 40. The AI system 40 can include such components as a natural-language processor module 41, a grammar-based prediction engine 42, a self-adapting predictor engine 44, and a multi-class classifier 46. The memory 22 also can store a machine learning (ML) model 50. When servicing multiple organizations, the server system 12 can store multiple ML models 50 in the memory 22 or an external database.

Each of the workstations 14A and 14B can include one or more processors 60, a user interface 62 which can include any suitable input and output devices, and a memory 64 readable by the one or more processors 60. The memory 64 can store a client application 64 via which a user can access the AI system 40. The client application 64 can be a web browser, for example, or a special-purpose software application.

The client workstations 14A and 14B can access respective local databases 70A and 70B. These databases can store data records such as invoices along with the associated data (used as labels when training a ML model, for example). For example, the organization with which the workstation 14A is associated can receive invoices from multiple service providers such as law firms. A representative of the organization may wish to use the functionality of the AI system 40 without uploading the invoices to the server system 12. Accordingly, he or she can request that the AI system 40 operate on the training data stored locally in the database 70A when developing the ML model 50. Further, a representative of the organization with which the workstation 14B is associated can choose to store both the training data and the ML model in the local database 70B.

In some implementations, at least some of the functionality of the AI system 40 can be accessible via an application programming interface (API). Rather than requesting data from the server system 12, the client application 64 can invoke the API to apply the functionality of one or more of components 41, 42, 44, 46, etc. to data stored locally in the database 70, for example. However, client-side performance of the AI system 40, or even a portion of the AI system 40, is likely to be limited due to the lower processing power and smaller memory available at a workstation.

More generally, the functionality of the AI system 40 as well as the training data, the model, and the output data can be distributed among network nodes in any suitable manner.

In operation of the system illustrated in FIG. 1, the AI system 40 can present a user interface via which an operator can define features, upload guidelines from which the AI system 40 can extract certain features for developing the ML model 50, upload training data, upload invoices to be tested against the ML model 50, view the output of the AI system

40 such as listings of invoices potentially requiring adjustments, etc. The AI system 40 also can support data upload and execution of data in a batch mode, e.g., according to a predefined schedule.

Next, example processing of data records the AI system 40 can implement is discussed with reference to FIG. 2. A diagram 100 generally illustrates flow of data in the direction indicated by arrows. However, it will be understood that some of the functionality illustrated in FIG. 2 can be executed in parallel with the other functionality. For example, the AI system 40 can execute natural language processing with respect to one portion of data, apply multi-class classification with respect to another portion of the data, and extract features from another portion of the data. Further, the AI system 40 can execute the functions of FIG. 2 iteratively to continuously update, or recalibrate, the ML model.

Figure 2:
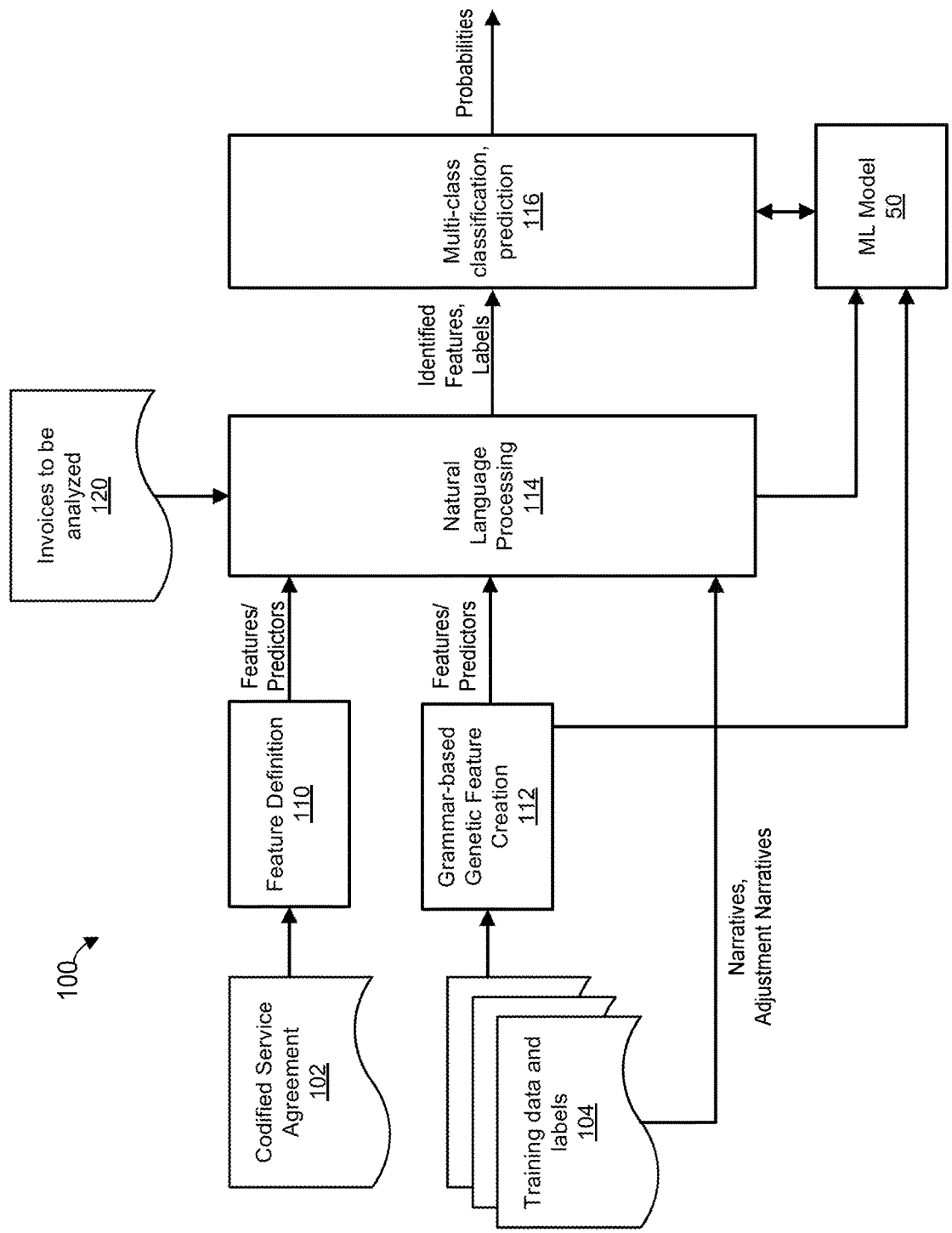
FIG. 2 is a block diagram that illustrates example processing of data records in the system of FIG. 1.

As illustrated in FIG. 2, one of the inputs to the feature definition functionality of the AI system 40 can include a codified service agreement 102. A typical codified service agreement of an organization, such as billing guidelines provided to law firms, specifies certain types of services and indications of ranges or fixed amounts the organization expects to pay for the services. A codified service agreement also can specify required or preferred formats for various narratives, indications of additional data to be included in voices (e.g., names of individuals rendering the services, dates on which the services were rendered, outcomes of certain tasks), restrictions of various types of services (e.g., a certain level of experience necessary to perform a task), etc. In any case, a codified service agreement generally specifies a set of rules and, indirectly, features that can be extracted relatively easily at a feature definition stage 110.

For a certain organization, the AI system 40 can receive a codified service agreement in the form of a text file, an image file that can be processed using optical character recognition (OCR) techniques, or any other suitable format. In a generally similar manner, an operator associated with the organization can specify various rules via the user interface of the AI system 40. Depending on the implementation, the operator can specify high-level rules similar to those included in a typical codified service agreement (e.g., "a flat fee of $100 for reviewing a new matter"). Additionally or alternatively, the AI system 40 can expose an interface for direct feature engineering, e.g., for specifying features such as the word "reviewing" or the n-gram "reviewing a new matter."

The AI system 40 need not always receive a codified service agreement or user-specified features when constructing an ML model and, in some cases, the AI system 40 extracts the features automatically. In the diagram of FIG. 2, the AI system 40 can apply grammar-based genetic feature creation to training data 104. Genetic feature creation functionality 112 generally mimics the mechanics of genetics and natural selection. As one example, the AI system 40 can determine, through multiple iterations of testing versions of an ML model with different candidate features, which of the terms or n-grams in the narrative or another portion of the text can be used as features.

The training data 104 can include multiple invoices. In an example implementation, the AI system 40 is configured to process invoices for a particular industry such as the legal industry, for example. The AI system 40 can process each legal invoice as a data record including multiple features collectively defining the informational payload of each invoice. Each feature describes a certain measurable characteristic of the invoice, and may correspond to a single attribute of the invoice (e.g., "dollar amount," "number of billable hours," "role of the timekeeper") or a construct including several attributes (e.g., "dollar amount along with the number of billable hours"). As used in this disclosure, the terms "attribute" or "parameter" can be used interchangeably. A feature present in an invoice typically has an associated value. For example, an invoice can indicate that the number of billable hours is 3.5 or that the dollar amount is $450.

In addition to various attributes and corresponding values, the training data 104 can include information on the basis of which the AI system 40 can generate labels, or indications of how a human characterized the invoice or a portion of the invoice. For example, a certain invoice may include validity data that defines a single binary label, with values "approved" or "rejected." Another invoice can include multiple line items, each of which can be approved or rejected individually. More generally, a label can correspond to one of any number of values. The training data 104 can include validity data in the form of metadata to define one or multiple labels. For example, the header of a file storing an invoice can include the indication of whether the invoice was approved or rejected.

In a typical case, an invoice can have a certain fixed, or at least highly predictable, structure as well as a narrative section. More particularly, an invoice can include certain pre-defined codes at one or more levels (e.g., task code, activity code, country code, state code), agreed-upon amounts, dates in a pre-defined format, names or initials, etc. Some of these codes may have mandatory presence in accordance with the corresponding codified service agreement. Moreover, some codified service agreements may define the precise location of each mandatory code. Some of the codes whose presence is not mandatory may be associated with unique keywords such as "country" or "billable rate." In any case, a portion of the typical invoice is susceptive to parsing using a set of semantic rules.

Because some of the fields with a specified information type can include variations in wording (e.g., the same field in two invoices with a shared format can include the text "country=US" or simply "US"), natural language processing functionality 114 can augment the parsing functionality of the AI system 40. Moreover, the functionality 114 can including processing the narrative portion of the invoice to identify possible irregularities. More particularly, in addition to augmenting the parsing functionality of the AI system 40 to determine variations in the structured portion of an invoice, the functionality 114 can allow the AI system 40 to process the unstructured, narrative part of the invoice. The functionality 114 can be implemented using Python, NLTK, TF-IDF, Elastic Net, and other suitable programming languages and/or techniques.

Multi-class classification functionality 116 can allow training data to be classified into various classes, at one or multiple hierarchical levels. For example, the AI system can classify The functionality of FIG. 2 can be distributed among the components of the AI system 40 (see FIG. 1) in any desired manner. For example, the natural-language processor module 41 can implement the functionality 114 as well as the functionality 112; the grammar-based prediction engine 42 can implement some of the functionality 112; the multi-class classifier 46 can implement the functionality 116; the self-adapting predictor engine 44 can implement some of the functionality 112 and 116, etc.

In an example implementation, the AI system 40 trains the ML model 50 using various features generated based on one or more of the codified service agreement 102, the training and label data 104, and operator input. The AI system 40 in some cases applies natural language processing to identify some of the features. The ML model 50 can be based on multi-class classification. In some cases, the AI system 40 can develop balanced multi-class classification to avoid biasing predictions toward certain classes. In any case, the AI system 40 can receive invoices 120 to be analyzed using the ML model 50, extract features from the invoices 120 using natural language processing, and apply the ML model 50 generate probabilities that the individual invoices, or items within the invoices, should be adjusted.

For example, the invoices 120 can include an invoice specifying a certain task (e.g., "document review"), the billable rate, the date on which the service was rendered, the name of the person rendering the service, the total amount, the discount, etc. The invoice can specify this information in accordance with the formatting rules and the substantive restrictions specified in the codified service agreement 102. The invoice also can include a narrative from which the AI system 40 can extract features using natural language processing techniques and, in some cases, the ML model 50. The AI system 40 then can determine, using the ML model 50, how closely the set of features included the invoice (in other words, the "feature vector" describing the invoice) corresponds to different labels. For example, the AI system 40 can indicate that there is a 70% probability that the invoice should be adjusted. If desired, the AI system 40 can be configured to generate a specific prediction regarding the direction in which a certain value should be adjusted.

Figure 3:
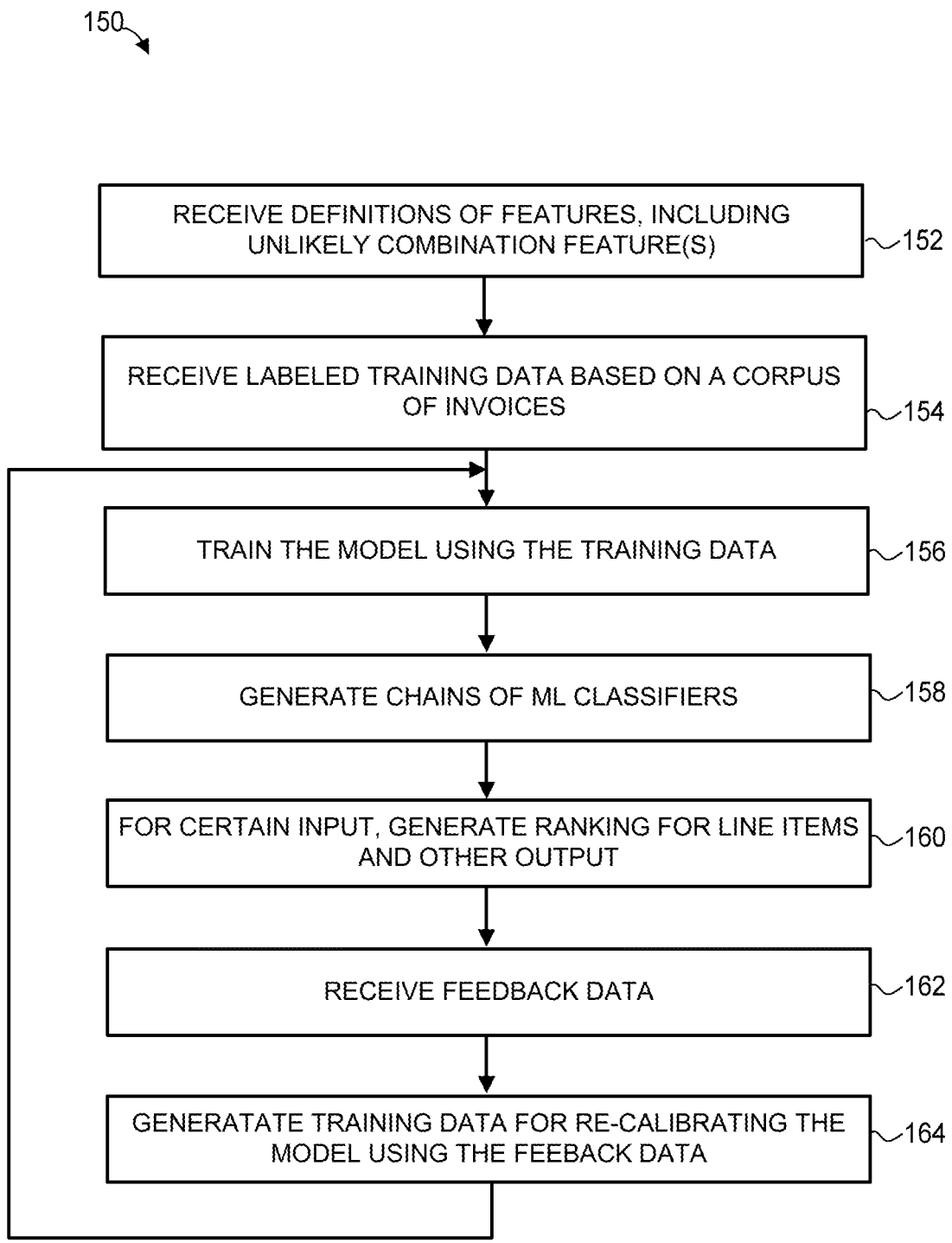
FIG. 3 is a flow diagram of an example method for training and re-calibrating an ML model for processing invoices, which can be implemented in the system of FIG. 1.

FIG. 3 illustrates an example method 150 for training and re-calibrating an ML model for processing invoices, which can be implemented in the computing environment 10 (e.g., as part of the AI system 40). More particularly, the method 150 can be implemented a set of instructions executable by one or more processors.

The method begins at block 152, where definitions of features are received. As discussed above, the features can be received via the user interface or generated automatically. In some implementations, an ML model can be trained using an unlikely combination feature which corresponds to a pair of attributes whose concurrent presence is unlikely in a valid legal invoice, for certain values of the first attribute and the second attribute. For example, certain combinations of attribute "Task Type" and attribute "Timekeeper's Role" should be rejected in an invoice pertain to one type of service or legal representation but approved in connection with another service. As a more specific example, one organization may expect Task Type "document review" to be performed by timekeepers whose role is listed as "associate" or "paralegal," whereas another organization may approve legal invoices where document review is performed by timekeepers whose role is listed as "partner." In some cases, for the same task type, the same organization can expect different firms to assign timekeepers with different roles when, for example, a small firm has lower hourly rates than a large firm. The ML model in general can adopt the unlikely combination feature to any legal matter portfolio or type of arrangement.

Some of the advantages of using this feature can be understood in comparison with a hypothetical ML model in which the two attributes in the example above belong to two separate features, $F_i$ and $F_j$, rather than a single unlikely combination feature. The features $F_i$ and $F_j$ in the hypothetical ML model are included a larger set of features $F_1, F_2 \ldots F_N$ corresponding to attributes $A_1, A_2 \ldots A_N$, respectively. The invoices used as part of a training data set accordingly define a feature vector $(A_1, A_2 \ldots A_N)$, along with a label for the feature vector (e.g., "approved" or "rejected"), where $A_i$ and $A_j$ are separate elements of the feature vector. In contrast, the unlikely combination feature of this disclosure corresponds to a tuple $(A_i, A_j)$ rather than two single values $A_i$ or $A_j$. Accordingly, for the same example set of attributes $A_1, A_2 \ldots A_N$, the feature vector advantageously can be reduced in size from N to N−1: $(A_1, A_2, \ldots (A_i, A_j) \ldots A_N)$. Because a larger number of features results in higher complexity of the model, the unlikely combination feature of this disclosure can reduce the number of operations required to train and/or apply the ML model as well as the amount of computer memory required to train and apply the ML model. The ML model in other words is constructed using features that improve the accuracy of the ML model and require a smaller training data set and/or fewer operations required during training and application. As a result, the ML model of this disclosure improves the functioning of the server system 12 or some other processing platform on which the AI system 40 executes. The ML model thus provides an improvement of the technical field of automatically processing invoices.

Another feature the AI system 40 can use is a risk index for a certain service provider. To continue with the example of invoices in the legal industry, the AI system 40 can use historical data to determine the relative level of risk associated with invoices received from a certain law firm. If, for example, the invoices from a first firm historically are rejected at the rate of 5%, whereas the invoices from a second firm historically are rejected at the rate of 2%, the AI system 40 can generate a risk index feature for the first firm with an example value of 0.05, and accordingly generate a risk index feature for the second firm with an example value of 0.02. As a result, when the AI system 40 subsequently applies the ML model to two otherwise indistinguishable invoices from the two firms, the respective risk index feature (which can operate as a hidden variable, for example) affects the resulting probability of adjustment.

Still another feature the AI system 40 can use is an out-of-pattern occurrence of certain data. Again, the AI system 40 can generate different probabilities of adjustment for two invoices with similar data, if these two invoices correspond to datasets associated with different respective historical patterns. The datasets need not correspond to different firms or other service providers and instead can correspond to types of invoices. For example, the AI system 40 can determine that, for a certain type of activity, the dataset can be expected to include in the narrative the text of "reviewed N documents," with a high degree of reliability. An invoice specifying the same type of activity that includes text that conveys similar information in a different format, such as "attention to N documents" can include the out-of-pattern indication as a separate feature, even if the AI system 40 ultimately classifies the sentences "reviewed N documents" and "attention to N documents" similarly, e.g., as a common document review feature.

Yet another feature the AI system 40 can use is the natural language processing (NLP) score generated by the natural language processor 41 based on the text of the narrative, for example. The NLP score can be indicative of the level of complexity of operations the natural language processor 41 has to execute to analyze the text. High complexity of operations may correlate with errors in the narrative and, accordingly, errors in a line item or the entire invoice.

Similar to the unlikely combination feature discussed above, the risk index feature, the out-of-pattern feature, and the NLP score features can reduce the complexity of the ML model and/or improve accuracy of predictions.

With continued reference to FIG. 3, labeled training data can be received at block 154. Depending on the implementation, the training data can be a "raw" data set that includes invoices in the original format along with metadata indicating approval, rejection, in some cases reasons for rejections, etc., or a pre-processed data set which the AI system 40 modifies to conform to a certain format. In other words, the AI system 40 can normalize the training data set before application to the ML model. Because normalization can effectively mask certain information, the AI system 40 in some implementations or scenarios does not carry out pre-processing. In other implementations or scenarios, the AI system normalizes the training data to make training more efficient.

Next, at block 156, the model is trained using the training data. In general, the model can be trained for any suitable number of features and predictors. However, as discussed above, the number and the type of features used can affect performance of the AI system 40 when training the ML model and/or when applying the ML model to invoices to be validated.

Chains of machine learning classifiers can be generated at block 158. Referring back to FIG. 1, for example, the multi-class classifier 46 can classify a certain corpus of invoices into such classes as pre-trial invoices, trial invoices, post-trial invoices. As another example, the multi-class classifier 46 can classify certain terms that appear in invoices into task descriptors, activity descriptors, country code indicators, etc. In general, the AI system can apply multi-class classification at any level.

At block 160, the ML model can be applied to a certain invoice to generate output such as the probabilities of certain line times being rejected, and/or the probability that the entire invoice will be rejected. The AI system 40 in various implementations and/or scenarios can identify potentially unbillable items, individual roles being out of norm, mismatches between activities and rates, situations where prior approval was needed, and top violators within the organizations or those organizations that collectively are top violators. When generating output, the AI system 40 can rank line items in accordance with the determined probabilities of adjustment, for example.

At block 162, feedback data can be received. More particularly, the AI system 40 can provide an interface via which an operator can indicate how accurately the AI system 40 predicted the adjustments. For example, an operator can signal agreement or disagreement with the predictions generated using the ML model. The AI system 40 then can re-calibrate the ML model using the feedback data received at block 162. In particular, at block 164, the AI system 40 can express the feedback 40 as an additional training data set, and the flow can return to block 156.

Figure 4:
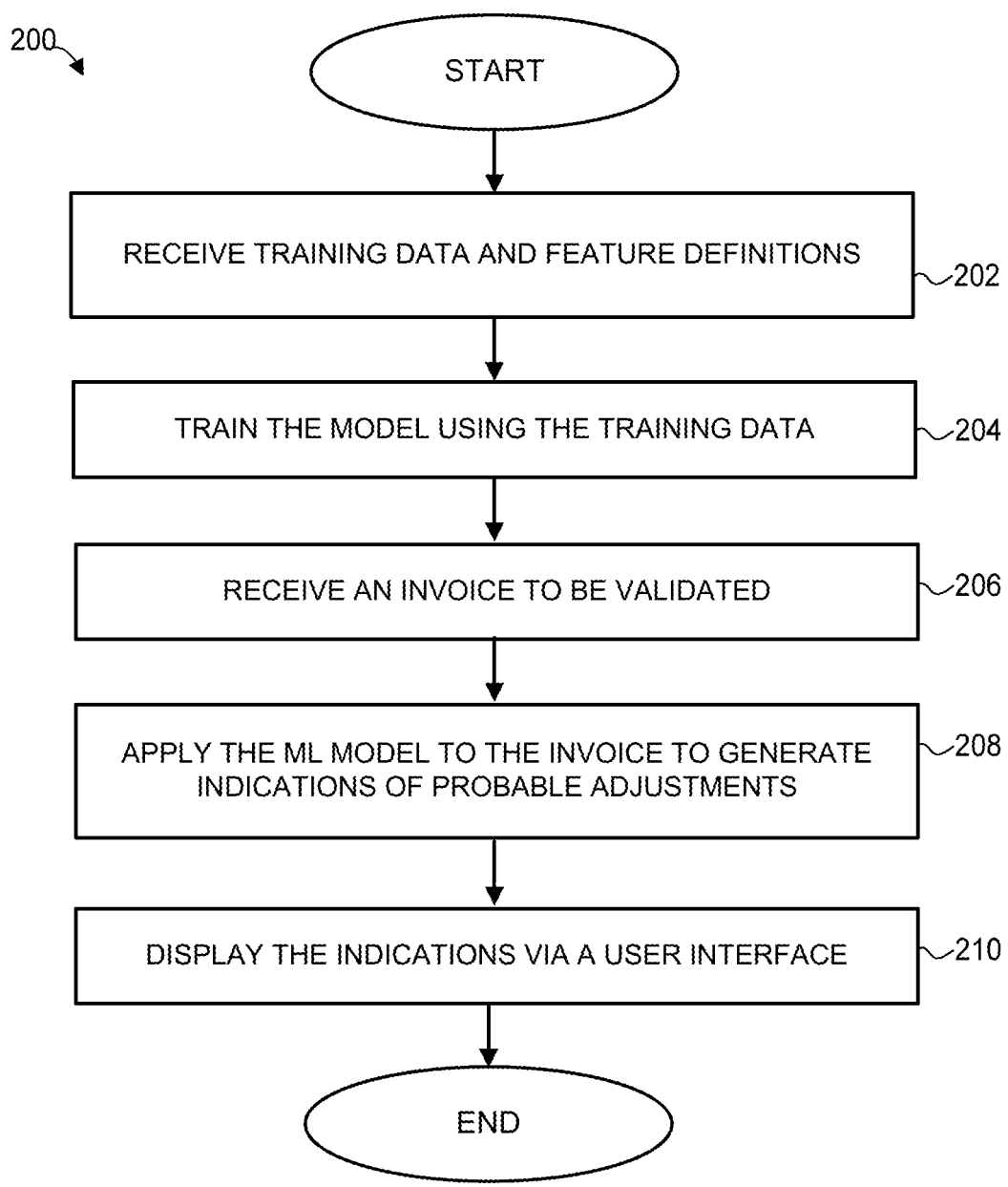
FIG. 4 is a flow diagram of an example method for applying the training model, which can be implemented in the system of FIG. 1.

Next, FIG. 4 illustrates an example method 200 for processing of data records in the system of FIG. 1 by applying an ML model. Several steps of the method 200 are similar to the steps of the method 150 discussed above. In particular, training data and feature definitions can be received at block 202. As discussed above, the training data can include invoices along with validation data that can be used in labeling, and feature definitions can be provided by users and generated automatically by the AI system 40. Next, at block 204, the model can be trained using the information received at block 202. After an invoice to be invalided is received at block 206, the ML model is applied to the invoice at block 208. The indications of probable adjustments then are displayed via the user interface at block 210.

For further clarity, several examples of applying rules and principles of feature extraction are discussed next with reference to FIGS. 5-9. The AI system 40 discussed above can process invoice narratives in accordance with these example techniques.

Figure 5:
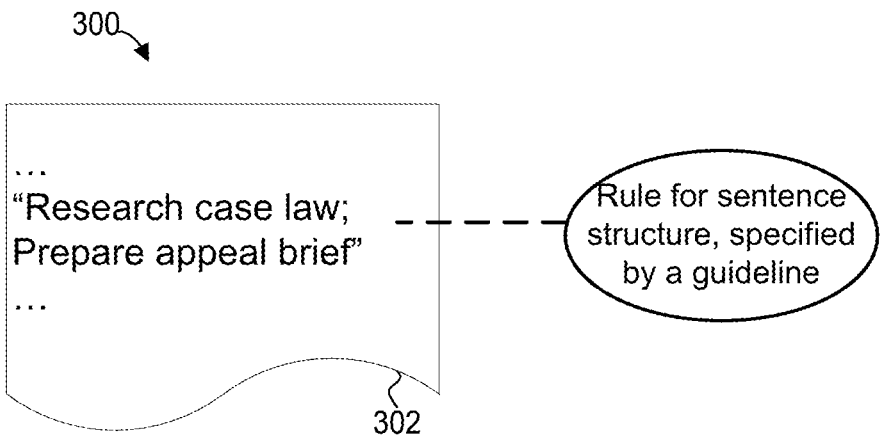
FIG. 5 schematically illustrates an example application of a semantic rule to a narrative included in an invoice.

FIG. 5 schematically illustrates an example application of a semantic rule to a narrative included in an invoice. In this example, a text snippet 302 includes a semicolon. A rule according to which invoices with semicolon are to be rejected may be included in the codified service agreement 102 (see FIG. 1) in an explicit format immediately identifiable by the AI system 40. In another scenario, the AI system 40 effectively derives the rule against semicolons from the training data in which a certain number of invoices including the semicolon feature are labeled as rejected.

Figure 6:
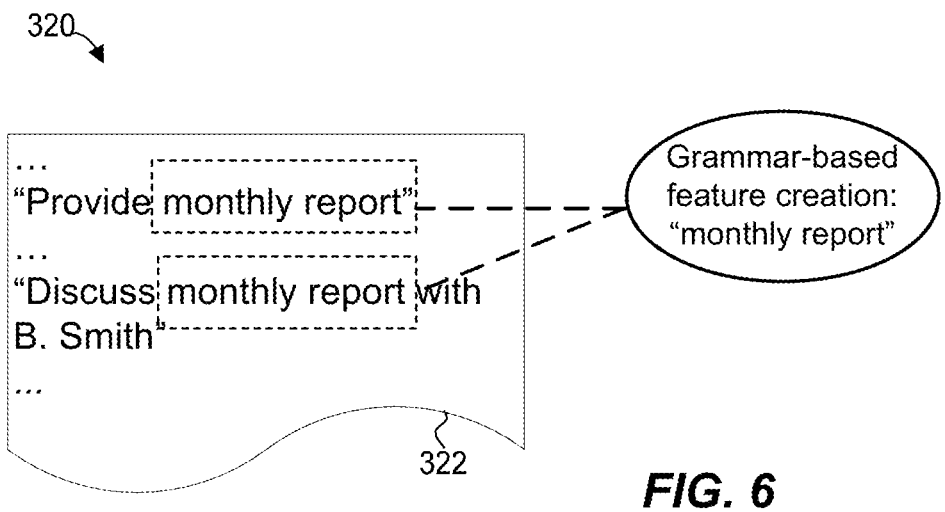
FIG. 6 schematically illustrates example feature creation based on a narrative included in an invoice.

FIG. 6 schematically illustrates example feature creation based on a narrative included in an invoice. Portions 322 within one or several narratives include several transitive verbs, such as "discuss" and "provide," followed by the n-gram "monthly report" which the AI system 40 can identify as potential features when constructing the ML model. Using genetic or other suitable feature generation techniques, the AI system 40 can select "monthly report" as a candidate feature, determine whether this candidate feature appears to operate successfully in the ML model, in view of the training data and the labels, and either accept or reject "monthly report" as a feature.

Figure 7:
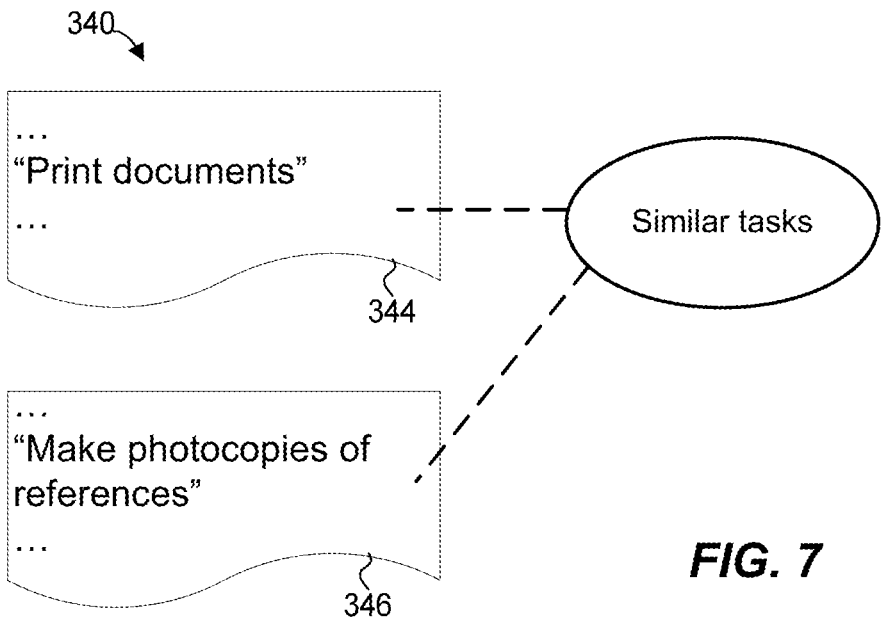
FIG. 7 schematically illustrates example identification of narratives describing a similar task, which can be used in clustering.

Referring to FIG. 7 schematically illustrates example identification of narratives describing a similar task, which can be used in clustering. In this examples, snippets 344 and 346 from narratives included in different invoices refer to the same or very similar tasks using different expressions, "print documents" and "make photocopies of references." The AI system 40 can determine that these n-grams are related using clustering techniques, for example.

Figure 8:
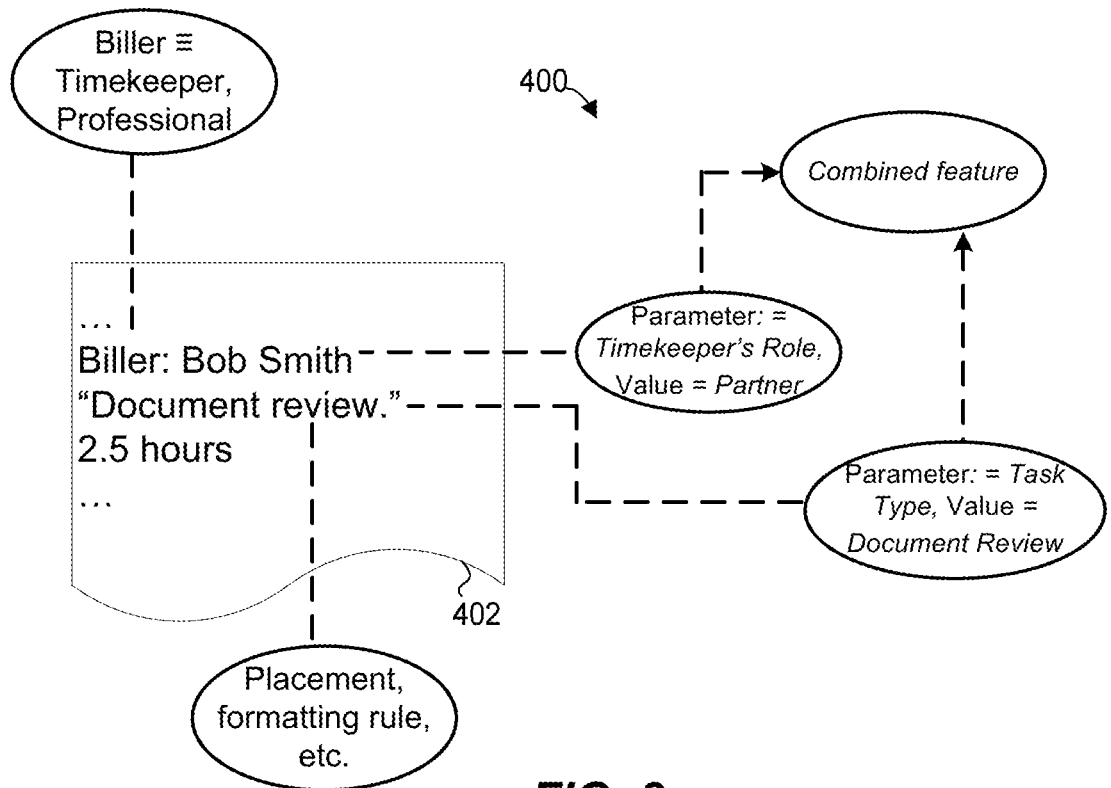
FIG. 8 schematically illustrates application of an unlikely combination feature when processing an invoice, which can be implemented in the system of FIG. 1.

FIG. 8 schematically illustrates application of an unlikely combination feature when processing an invoice, which can be implemented in the AI system 40, as discussed above. In this example, the AI system 40 determines that the name of the biller in a snippet 402 corresponds to the role of a partner. The AI system 40 further determines that the task performed is "document review." The AI system 40 can determine this information using clustering information (e.g., linking the term "biller" to "timekeeper" or "professional"), by analyzing placement of terms, formatting rules, etc. In this example, the AI system identifies attributes timekeeper's role and task type, along with the corresponding values. The AI system 40 then receives an indication that these two attributes should define a single unlikely combination feature, as a person with the role of a partner is not expected to conduct document review.

Figure 9:
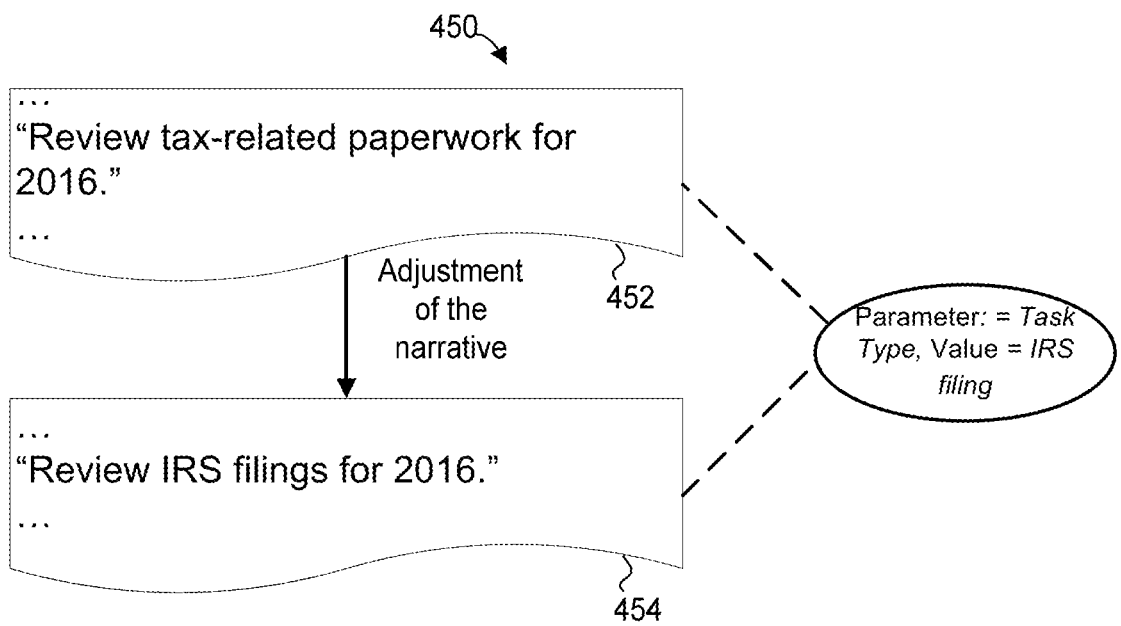
FIG. 9 schematically illustrates example feature identification using an adjustment narrative.

FIG. 9 schematically illustrates example feature identification using an adjustment narrative. In this example, the training data can include an invoice, an indication that the invoice was rejected, an adjusted invoice, and indication that the adjusted invoice was approved. The AI system 40 can use these data points to identify a feature.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for efficiently distributing alert messages through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for automatically identifying potentially invalid invoices, the method comprising:

receiving, by one or more processors, a description of a machine learning (ML) model comprising a plurality of features including an unlikely combination feature, the unlikely combination feature corresponding to a tuple of a feature vector, the tuple comprising a first attribute to be located in an invoice and a second attribute to be located in the invoice concurrently with the first attribute so as to reduce a size of the feature vector for training the ML model;

receiving, by the one or more processors, training data comprising (i) invoice data including a plurality of invoices, each including the first attribute and the second attribute, and respective values of the first attribute and the second attribute, and (ii) validity data including indications of which of the plurality of invoices are valid and which of the plurality of invoices are invalid;

training, by the one or more processors, the ML model using the training data, in accordance with the definition of the ML model, including applying the values of the first attribute and the second attribute to the unlikely combination feature corresponding to the tuple of the feature vector;

receiving, by the one or more processors, an invoice to be validated;

applying, by the one or more processors, the ML model to the received invoice to determine a probability that the invoice is invalid; and providing an indication of the determined probability to a user via a user interface.

2. The computer-implemented method of claim 1, wherein the first attribute is a task for which one or more billing entries were generated, and the second attribute is a role of a person who performed the task according to the one or more billing entries.

3. The computer-implemented method of claim 1, wherein the first attribute is a task for which one or more billing entries were generated, and the second attribute is a matter in connection with which the task was performed.

4. The computer-implemented method of claim 1, wherein the first attribute is a billable rate at which a task was performed, and the second attribute is units of time at which the billable rate was applied.

5. The computer-implemented method of claim 1, further comprising:

providing a user interface via which an operator selects, from among the plurality of attribute, the first attribute and the second attribute, to be associated with the unlikely combination feature.

6. The computer-implemented method of claim 1, further comprising applying natural language processing to the training data to extract features.

7. The computer-implemented method of claim 1, wherein receiving the description of the ML model includes receiving a description of a risk index feature indicative of a level of risk associated with an organization from which the invoice was received, the risk index feature generated based on historical trends associated with the organization.

8. The computer-implemented method of claim 1, wherein receiving the description of the ML model includes receiving an out-of-pattern feature indicative of a deviation of text from a pattern associated with a same meaning as the text.

9. The computer-implemented method of claim 1, wherein receiving the description of the ML model includes receiving a natural language processing (NLP) score feature indicative of a complexity of processing text included in the invoice by a natural language processor.

10. The computer-implemented method of claim 1, further comprising:
receiving, by the one or more processors, feedback data indicative of accuracy of the indication; and
re-calibrating the ML model, including further training the ML model using the feedback data.

11. A computing system comprising:
one or more processors; and
a non-transitory computer-readable medium storing thereon instructions that, when executed by the one or more processors, cause the computing system to implement a method including:
receiving a description of a machine learning (ML) model comprising a plurality of features including an unlikely combination feature, the unlikely combination feature corresponding to tuple of a feature vector, the tuple comprising a first attribute to be located in an invoice and a second attribute to be located in the invoice concurrently with the first attribute so as to reduce a size of the feature vector for training the ML model,
receiving training data comprising (i) invoice data including a plurality of invoices, each including the first attribute and the second attribute, and respective values of the first attribute and the second attribute, and (ii) validity data including indications of which of the plurality of invoices are valid and which of the plurality of invoices are invalid,
training the ML model using the training data, in accordance with the definition of the ML model, including applying the values of the first attribute and the second attribute to the unlikely combination feature corresponding to the tuple of the feature vector,
receiving an invoice to be validated,
applying the ML model to the received invoice to determine a probability that the invoice is invalid, and
providing an indication of the determined probability to a user via a user interface.

12. The computing system of claim 11, wherein the first attribute is a task for which one or more billing entries were generated, and the second attribute is a role of a person who performed the task according to the one or more billing entries.

13. The computing system of claim 11, wherein the first attribute is a task for which one or more billing entries were generated, and the second attribute is a matter in connection with which the task was performed.

14. The computing system of claim 11, wherein the first attribute is a billable rate at which a task was performed, and the second attribute is units of time at which the billable rate was applied.

15. The computing system of claim 11, wherein the method further includes providing a user interface via which an operator selects, from among the plurality of attribute, the first attribute and the second attribute, to be associated with the unlikely combination feature.

16. The computing system of claim 11, wherein the method further includes applying natural language processing to the training data to extract features.

17. The computing system of claim 11, wherein the method further includes receiving the description of the ML model includes receiving a description of a risk index feature indicative of a level of risk associated with an organization from which the invoice was received, the risk index feature generated based on historical trends associated with the organization.

18. The computing system of claim 11, wherein the method further includes receiving the description of the ML model includes receiving an out-of-pattern feature indicative of a deviation of text from a pattern associated with a same meaning as the text.

19. The computing system of claim 11, wherein the method further includes receiving the description of the ML model includes receiving a natural language processing (NLP) score feature indicative of a complexity of processing text included in the invoice by a natural language processor.

20. The computing system of claim 11, wherein the method further incudes:
receiving, by the one or more processors, feedback data indicative of accuracy of the indication; and
re-calibrating the ML model, including further training the ML model using the feedback data.

* * * * *